Nov. 4, 1947.  S. M. MERCIER  2,430,236
BEARING AND SHAFT ASSEMBLY
Original Filed Sept. 1, 1943

INVENTOR;
STANLEY M. MERCIER,
BY
ATT'Y.

Patented Nov. 4, 1947

2,430,236

UNITED STATES PATENT OFFICE 2,430,236

BEARING AND SHAFT ASSEMBLY

Stanley M. Mercier, Bexley, Ohio, assignor, by mesne assignments, to The Jeffrey Manufacturing Company, a corporation of Ohio Original application September 1, 1943, Serial No. 500,799. Divided and this application January 1, 1945, Serial No. 570,950

5 Claims. (Cl. 308—36.1)

This invention relates to a bearing and shaft assembly and an object thereof is to provide improved and simplified means whereby the oil or grease sealing device, for example in the form of a felt washer, may be readily removed and renewed adjacent the shaft and housing opening while the shaft is supported on its bearing.

Another object of the invention is to provide an improved bearing housing adapted to receive a shaft and provide a seal therewith in which improved mechanism is provided to renew the seal.

Other objects of the invention will appear hereinafter the novel features and combinations being set forth in the appended claims.

Figure 1:
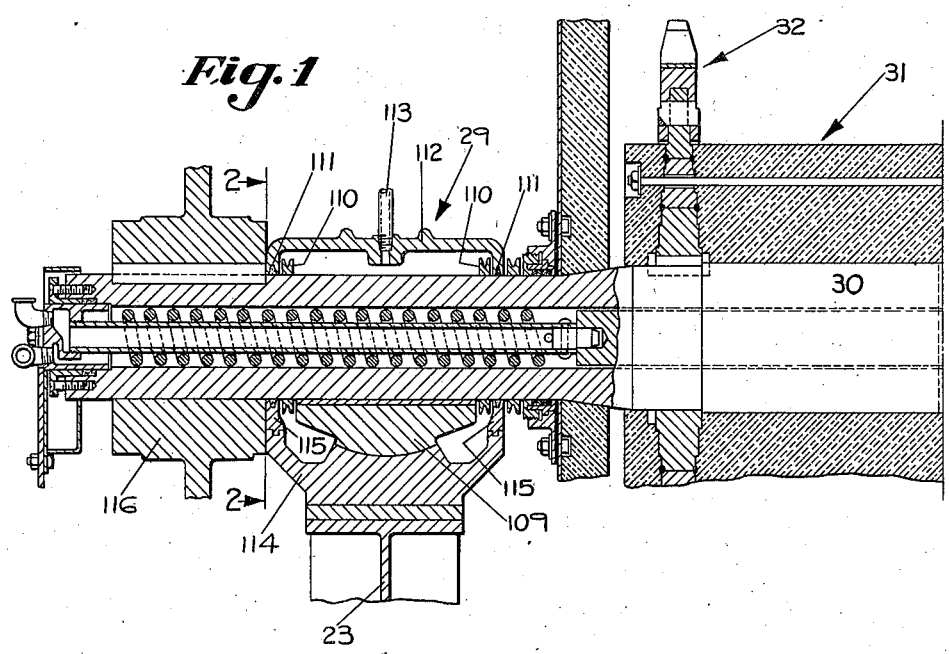
Figure 2:
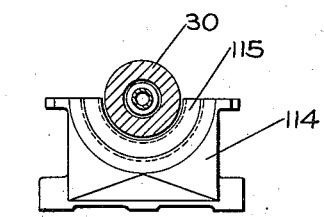

In the accompanying drawings,

Fig. 1 is a transverse sectional elevational view showing a portion of an elevator including the features of my invention, and Fig. 2 is a sectional view taken on the line 2—2 of Fig. 1, looking in the direction of the arrows.

This application is a division of my application Serial No. 500,799, filed Sept. 1, 1943, for an Elevator.

In my parent application, above identified, an elevator is disclosed in complete detail. In this application only those elements which are important to the invention defined in the claims will be specifically described.

As best illustrated in Fig. 1 of the drawings a frame member is provided including an I-beam 23 on top of which is a bearing box 29. In the complete elevator there will be a pair of spaced apart bearing boxes 29 which support a horizontally extending head shaft 30 which carries a head support assembly 31 upon which is mounted a pair of sprockets, one of which is seen at 32. A support for the opposite ends of the shaft 30 is provided by a pair of self aligning bearings, one of which is seen at 109. Said bearing 109 is preferably babbitt or bronze lined and is only semi-cylindrical in shape and supports the bottom portion of the shaft 30, since the load on the shaft 30 is always in a downward direction. The bearing 109 is enclosed and protected by the bearing box 29 which provides a lubrication well. Oil drip rings 110 are provided on shaft 30.

Because of the great height of the head shaft of the elevator disclosed in my parent application above identified and because of the great weight on it, particularly when it is supporting conveyor mechanism, it is extremely desirable to be able to renew the felt washers 111 which form the oil and dirt seal between the cylindrical openings on opposite sides of the bearing box 29 and the shaft 30 without requiring removal of said shaft 30 from the bearing 109. The bearing box 29 therefore includes a removable cap 112 which preferably receives an oil pipe 113. Oil is circulated through box 29 and a drain pipe, not shown. The bottom, base or fixed portion of the bearing box 29 is in the form of a main casting 114 which is rigidly attached to the I-beam 23. This casting 114 is provided on opposite sides with removable arcuate segments 115 which on their bottoms have tongues fitting in and interlocking with grooves formed in the cooperating arcuate portions of the casting 114. It will be seen that when the cap 112 is removed the arcuate segments or portions 115 may be rotated to remove them from the casting 114, whereupon they may be lifted from the shaft 30. When the parts are fully assembled, the felt washers 111 are received in continuous circular grooves, half of each of which is formed in a segment 115, the other half in an arcuate edge of cap 112. It is obvious, however, that when the cap 112 and the segments 115 are removed, the felt washers 111 may be readily removed by radial movement. In other words, it is not necessary to slip them over the free end of the shaft 30 since they are originally cut to place them on the shaft 30 by radial movement which can be freely done when the cap 112 and the segment 115 are removed. To reinsert a segment 115, the groove thereof is preferably fitted over the felt washer 111 with the segment on top of the shaft 30. The segment is then rotated with its tongue in the groove in the casting 114 until it reaches its normal position, as viewed in Figs. 1 and 2 of the drawings. When both segments 115 are thus replaced, the cap 112 may be attached as by screws along the lateral edges thereof with the grooves thereof receiving the felt washer 111. It is thus evident that the seals provided adjacent the openings through which the shaft 30 extend into and out of the bearing box 29 may be readily renewed without removing the shaft 30 from the bearing 109. To provide for driving the shaft 30 a drive sprocket 116 is keyed to one end thereof.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I now desire to secure by Letters Patent of the United States is:

1. A bearing and shaft assembly including a bearing, a shaft on said bearing, a housing for said bearing, said housing having a fixed part and a removable cap portion and having a felt receiving groove at a side opening through which said shaft extends, a felt washer in said groove, the fixed part of said housing having an arcuate removable portion which includes the felt groove, there being a tongue and groove interconnection between said removable portion and the adjacent portion of said fixed part, said removable portion being removably held in place by said removable cap, whereby said felt washer may be renewed without removing said shaft from said bearing.

2. A bearing construction including a bearing member, a housing for said bearing member, said housing including a base and a cap removably attached to said base, said cap and base being formed to provide a shaft opening, a seal groove formed adjacent said shaft opening and partly in said cap and partly in said base, said base having an arcuate slidably removable section which includes the seal groove, and overlapping interlocking means on said base and removable section providing for removal of the latter by rotary movement when said cap is removed.

3. A bearing construction including a bearing member, a housing for said bearing member, said housing including a base and a cap removably attached to said base, said cap and base being formed to provide a shaft opening, a seal groove formed adjacent said shaft opening and partly in said cap and partly in said base, said base having an interfitting slidably removable section which includes the seal groove, and overlapping interlocking means on said base and removable section providing for removal of the latter by rotary movement when said cap is removed.

4. A bearing construction including a bearing member, a housing for said bearing member, said housing including a base and a cap removably attached to said base, said cap and base being formed to provide a shaft opening, a seal groove formed adjacent said shaft opening and partly in said cap and partly in said base, said base having a removable section which includes the seal groove, and interfitting interlocking means on said base and removable section providing for removal of the latter, said cap normally locking said removable section in said interlocking means.

5. A bearing and shaft assembly including a bearing, a shaft on said bearing, a housing for said bearing, said housing having a fixed part and a removable cap portion and having a felt receiving groove at each of a pair of side openings through which said shaft extends, felt washers in said grooves, the fixed part of said housing having arcuate removable portions adjacent the openings each of which includes a felt groove, there being tongue and groove interconnections between said removable portions and the adjacent portions of said fixed part, said removable portion being removably held in place by said removable cap, whereby said felt washers may be renewed without removing said shaft from said bearing.

STANLEY M. MERCIER.

REFERENCES CITED

The following references are of record in the file of this patent:

UNITED STATES PATENTS

| Number | Name | Date |
|---|---|---|
| 1,568,731 | Griffin et al. | Jan. 5, 1926 |
| 2,217,201 | Fast | Oct. 8, 1940 |

FOREIGN PATENTS

| Number | Country | Date |
|---|---|---|
| 280,029 | Great Britain | 1927 |
| 409,041 | Great Britain | 1934 |
| 100,526 | Australia | 1936 |